US011203500B2

(12) United States Patent
Yokoyama

(10) Patent No.: US 11,203,500 B2
(45) Date of Patent: Dec. 21, 2021

(54) IMAGE FORMING SYSTEM AND IMAGE FORMING APPARATUS

(71) Applicant: KYOCERA Document Solutions Inc., Osaka (JP)

(72) Inventor: Yoshiki Yokoyama, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 45 days.

(21) Appl. No.: 16/834,083

(22) Filed: Mar. 30, 2020

(65) Prior Publication Data
US 2020/0331715 A1 Oct. 22, 2020

(30) Foreign Application Priority Data
Apr. 17, 2019 (JP) .............................. JP2019-078813

(51) Int. Cl.
B65H 7/02 (2006.01)
B65H 1/26 (2006.01)
(Continued)

(52) U.S. Cl.
CPC ............... B65H 7/02 (2013.01); B65H 1/266 (2013.01); B65H 1/28 (2013.01); B65H 3/44 (2013.01); B65H 7/00 (2013.01); B65H 2407/21 (2013.01)

(58) Field of Classification Search
CPC ... B65H 3/44; B65H 7/00; B65H 7/02; B65H 7/04; B65H 7/18; B65H 2407/21; G03G 15/6514; G03G 2215/00392
See application file for complete search history.

(56) References Cited

U.S. PATENT DOCUMENTS 4,685,797 A * 8/1987 Ito ..................... G03G 15/50
399/85
8,038,143 B2 * 10/2011 Watanabe .............. B65H 31/02
271/162
(Continued)

FOREIGN PATENT DOCUMENTS

JP   S60-57865 A    4/1985
JP   H05162871 A    6/1993

OTHER PUBLICATIONS

The extended European search report issued by the European Patent Office dated Aug. 24, 2020, which corresponds to European Patent Application No. 20161081.3-1010 and is related to U.S. Appl. No. 16/834,083.

Primary Examiner — Prasad V Gokhale
(74) Attorney, Agent, or Firm — Studebaker & Brackett PC

(57) ABSTRACT

An image forming system includes an image forming apparatus having an apparatus main body, a sheet feeding cassette, a manual bypass tray, an opening/closing detection part and a sheet feeding source setting part. The apparatus main body has an input part to which a printing instruction is input. The manual bypass tray is displaced into an open posture and into a close posture. The sheet feeding source setting part sets the sheet feeding cassette or the manual bypass tray as a sheet feeding source. When the opening/closing detection part detects that the manual bypass tray is displaced from the close posture to the open posture and the printing instruction is input to the input part, regardless of the sheet feeding source input to the input part, the sheet feeding source setting part sets the manual bypass tray as the sheet feeding source.

7 Claims, 9 Drawing Sheets

(51) Int. Cl.
*B65H 1/28* (2006.01)
*B65H 3/44* (2006.01)
*B65H 7/00* (2006.01)

(56) References Cited

U.S. PATENT DOCUMENTS

| | | | |
|---|---|---|---|
| 2006/0127149 A1* | 6/2006 | Togashi | B65H 5/36 |
| | | | 399/392 |
| 2006/0159481 A1* | 7/2006 | Horiuchi | B41J 29/393 |
| | | | 399/88 |
| 2008/0044208 A1* | 2/2008 | Motoyoshi | G03G 15/6514 |
| | | | 399/376 |
| 2014/0027969 A1* | 1/2014 | Kondo | B65H 1/26 |
| | | | 271/9.02 |

* cited by examiner

IMAGE FORMING SYSTEM AND IMAGE FORMING APPARATUS

INCORPORATION BY REFERENCE

This application is based on and claims the benefit of priority from Japanese patent application No. 2019-078813 filed on Apr. 17, 2019, which is incorporated by reference in its entirety.

BACKGROUND

The present disclosure relates to an image forming system and an image forming apparatus.

An image forming apparatus is conventionally provided with a sheet feeding cassette and a manual bypass tray as a sheet feeding source from which a sheet is fed to an image forming part. For example, the sheet feeding cassette stores a large number of plain papers (such as a A4-size sheet and a A5-size sheet), and on the manual bypass tray, a small number of special papers (such as a postcard) are set. This makes it possible to easily perform printing processing on the sheets of various sizes and thicknesses.

In the above image forming apparatus, in a case where the sheet is fed from the openable and closable manual bypass tray, a user opens the manual bypass tray, sets the sheets on the manual bypass tray and then changes the sheet feeding source from the sheet feeding cassette to the manual bypass tray. However, if the user does not suitably change the sheet feeding source or forgets to change the sheet feeding source, there is a possibility that the user inputs a printing instruction while the sheet feeding cassette is set to the sheet feeding source even though he intends to feed the sheet from the manual bypass tray. When such a situation occurs, even though the user desires to feed the sheet from the manual bypass tray, the sheet is fed from the sheet feeding cassette, and there is a possibility that the printing processing cannot be performed suitably.

SUMMARY

In accordance with an aspect of the present disclosure, an image forming system includes an image forming apparatus; and a terminal apparatus connected to the image forming apparatus via a network. The image forming apparatus includes an apparatus main body, a sheet feeding cassette, a manual bypass tray, an opening/closing detection part and a sheet feeding source setting part. An apparatus main body has an input part to which a printing instruction is input. The sheet feeding cassette is stored in the apparatus main body. The manual bypass tray is attached to an outer face of the apparatus main body and displaced into an open posture where a sheet feeding becomes possible and into a close posture where the sheet feeding becomes impossible. An opening/closing detection part detects displacements of the manual bypass tray from the open posture to the close posture and from the close posture to the open posture. The sheet feeding source setting part sets the sheet feeding cassette or the manual bypass tray as a sheet feeding source. When the opening/closing detection part detects that the manual bypass tray is displaced from the close posture to the open posture and the printing instruction is input to the input part, regardless of the sheet feeding source input to the input part, the sheet feeding source setting part sets the manual bypass tray as the sheet feeding source.

In accordance with an aspect of the present disclosure, an image forming apparatus includes an apparatus main body, a sheet feeding cassette, a manual bypass tray, an opening/closing detection part and a sheet feeding source setting part. The apparatus main body has an input part to which a printing instruction is input. The sheet feeding cassette is stored in the apparatus main body. The manual bypass tray is attached to an outer face of the apparatus main body and displaced into an open posture where a sheet feeding becomes possible and into a close posture where a sheet feeding becomes impossible. The opening/closing detection part detects displacements of the manual bypass tray from the open posture to the close posture and from the close posture to the open posture. The sheet feeding source setting part sets the sheet feeding cassette or the manual bypass tray as a sheet feeding source. When the opening/closing detection part detects that the manual bypass tray is displaced from the close posture to the open posture and the printing instruction is input to the input part, regardless of the sheet feeding source input to the input part, the sheet feeding source setting part sets the manual bypass tray as the sheet feeding source.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
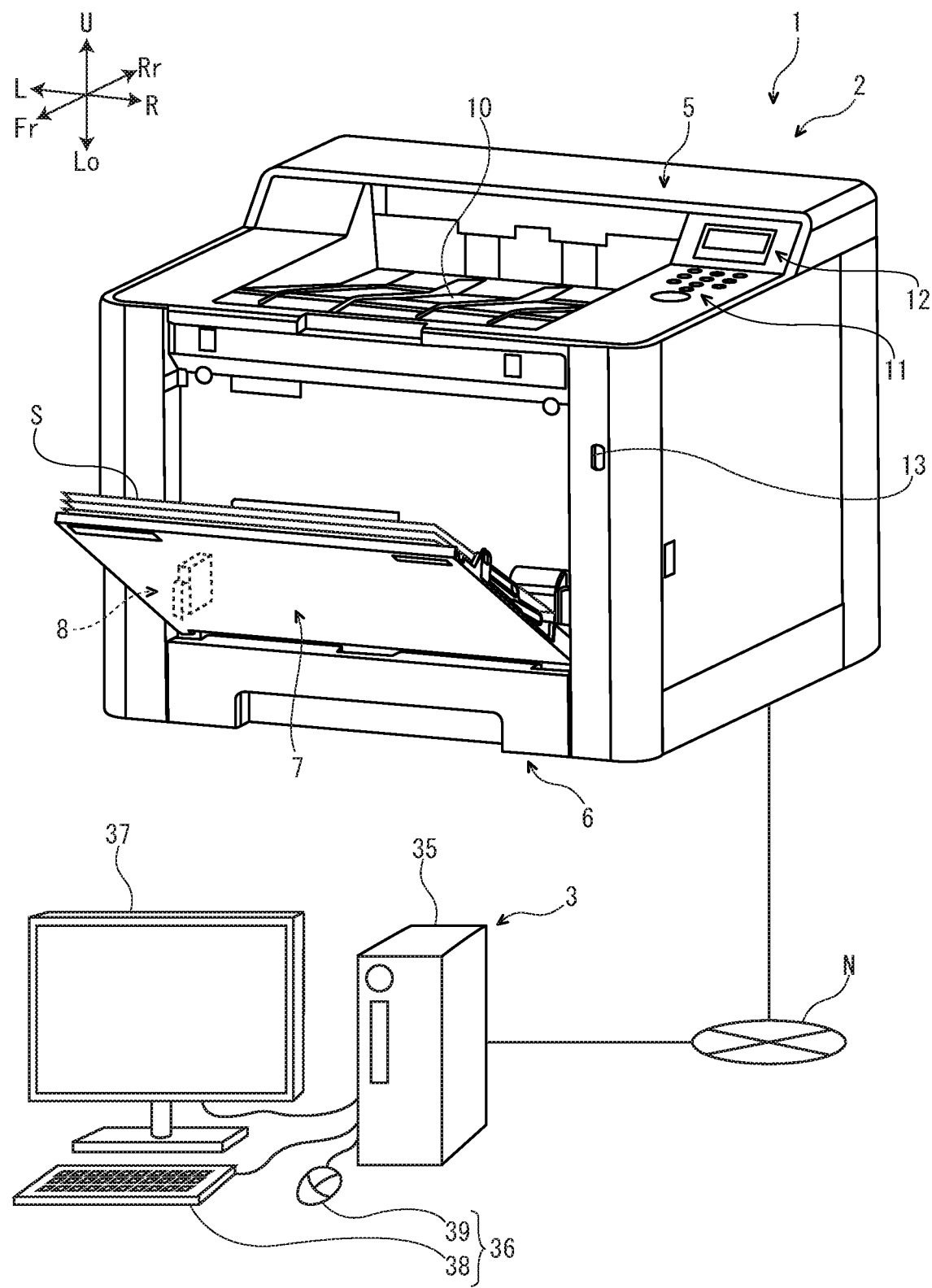
FIG. 1 is a perspective view showing an image forming system according to one embodiment of the present disclosure.

Hereinafter, an image forming system 1 according to one embodiment of the present disclosure will be described with reference to the drawings. With reference to FIG. 1, the image forming system 1 includes an image forming apparatus 2 and a terminal apparatus 3 connected to the image forming apparatus 2 via a network N.

Firstly, a configuration of the image forming apparatus 2 of the image forming system 1 will be described. Hereinafter, for convenience of explanation, a near side (a front side) of FIG. 1 is defined to be a front side of the image forming apparatus 2. Arrows Fr, Rr, L, R, U and Lo marked in FIG. 1 to FIG. 3 respectively show a front side, a rear side, a right side, a left side, an upper side and a lower side of the image forming apparatus 2. In the following description, the descriptions of "upstream", "midstream" and "downstream" respectively show "upstream", "midstream" and "downstream" in a conveyance direction of a sheet S in the image forming apparatus 2.

Figure 2:
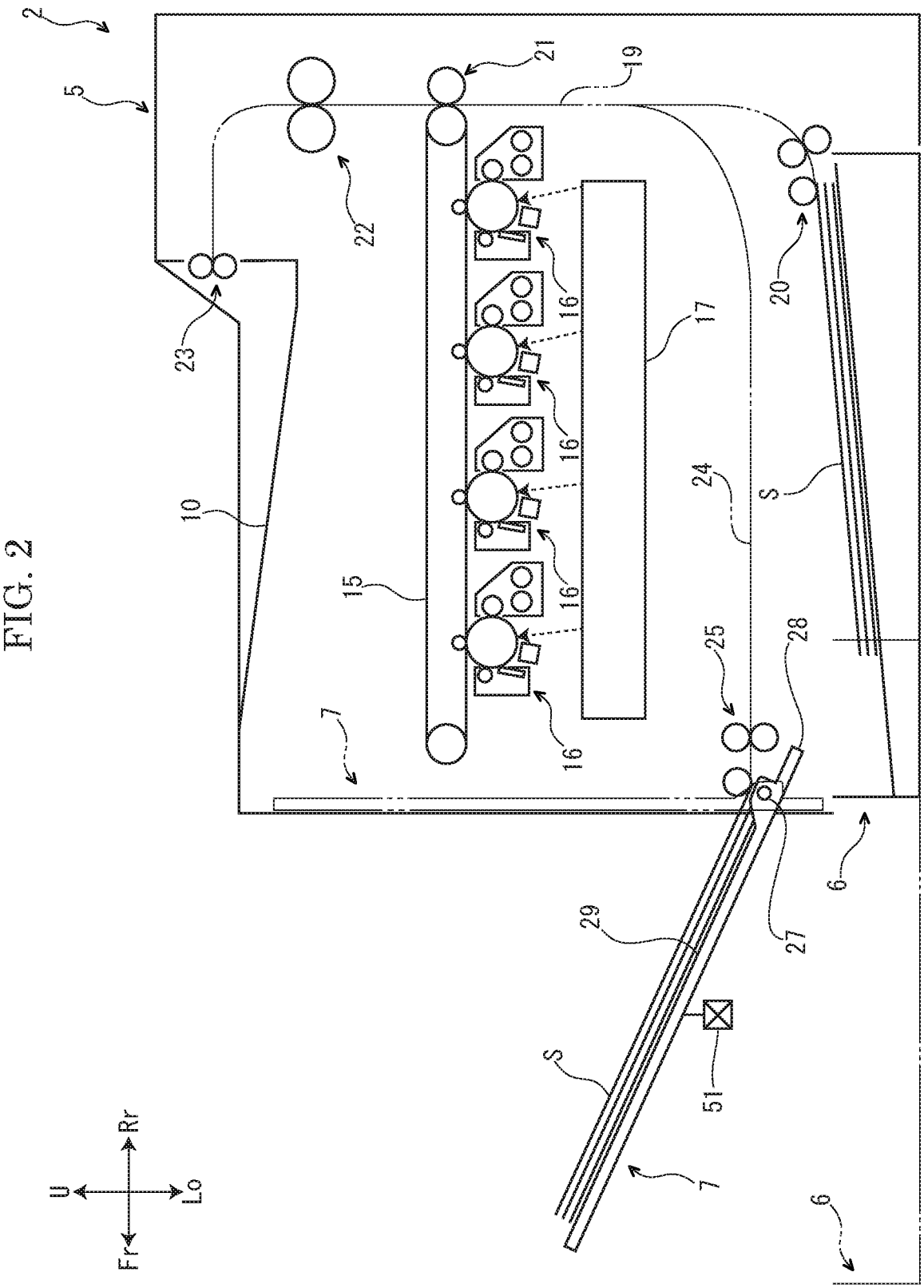
FIG. 2 is a side view showing an image forming apparatus according to the embodiment of the present disclosure.

With reference to FIG. 1 and FIG. 2, the image forming apparatus 2 is an electrophotographic type color printer, for example. The image forming apparatus 2 includes an apparatus main body 5, a sheet feeding cassette 6, a manual bypass tray 7 and an opening/closing sensor 8 (an example of an opening/closing detection part). The opening/closing sensor 8 is not shown in FIG. 2. Hereinafter, the elements of the image forming apparatus 2 will be described in the order.

Firstly, the apparatus main body 5 of the image forming apparatus 2 will be described.

With reference to FIG. 1, on the upper face of the apparatus main body 5, a discharge tray 10 is provided. On the upper face of the apparatus main body 5, an input part 11 and a display part 12 are provided on a right side of the discharge tray 10. The input part 11 has various operation keys such as a menu key, an arrow key and an execution key. A user instructs (inputs) setup conditions (number of the sheets to be printed, a sheet feeding source and the others) regarding printing to the input part 11. The sheet feeding source contains the sheet feeding cassette 6 and the manual bypass tray 7, described later. The display part 12 is constituted by a liquid crystal display, for example. On the right side portion of the front face (an example of an outer face) of the apparatus main body 5, a USB port 13 is provided.

With reference to FIG. 2, in the center portion of the apparatus main body 5, an intermediate transferring belt 15 is provided. In the center portion of the apparatus main body 5, four image forming parts 16 are provided below the intermediate transferring belt 15. In the center portion of the apparatus main body 5, an exposure device 17 is provided below the image forming parts 16.

In the rear portion of the apparatus main body 5, a main conveyance path 19 is provided from the lower side to the upper side. At the upstream end portion of the main conveyance path 19, a first sheet feeding unit 20 is provided. At the midstream portion of the main conveyance path 19, a secondary transferring part 21 is provided. At the downstream end portion of the main conveyance path 19, a discharge unit 23 is provided.

In the lower portion of the apparatus main body 2, a sub conveyance path 24 is provided from the front side to the rear side. At the upstream end portion of the sub conveyance path 24, a second sheet feeding unit 25 is provided. The downstream end portion of the sub conveyance path 24 is connected to the main conveyance path 19 on a downstream side of the first sheet feeding unit 20 and on an upstream side of the secondary transferring part 21.

Next, the sheet feeding cassette 6 of the image forming apparatus 2 will be described.

With reference to FIG. 1 and FIG. 2, the sheet feeding cassette 6 is stored in the lower end portion of the apparatus main body 5. The sheet feeding cassette 6 stores sheets S (for example, plain papers). The sheet feeding cassette 6 is movable in the front-and-rear direction with respect to the apparatus main body 5 between a position where the sheet feeding cassette 6 is inserted into the apparatus main body 5 (refer to the solid line in FIG. 2) and a position where the sheet feeding cassette 6 is drawn from the apparatus main body 5 (refer to the two-dotted chain line in FIG. 2). That is, the sheet feeding cassette 6 is inserted into the apparatus main body 5 in a drawable manner.

Next, the manual bypass tray 7 of the image forming apparatus 2 will be described.

With reference to FIG. 1 and FIG. 2, the manual bypass tray 7 is attached to the front face (an example of an outer face) of the apparatus main body 5. The manual bypass tray 7 is disposed above the sheet feeding cassette 6.

Figure 3:
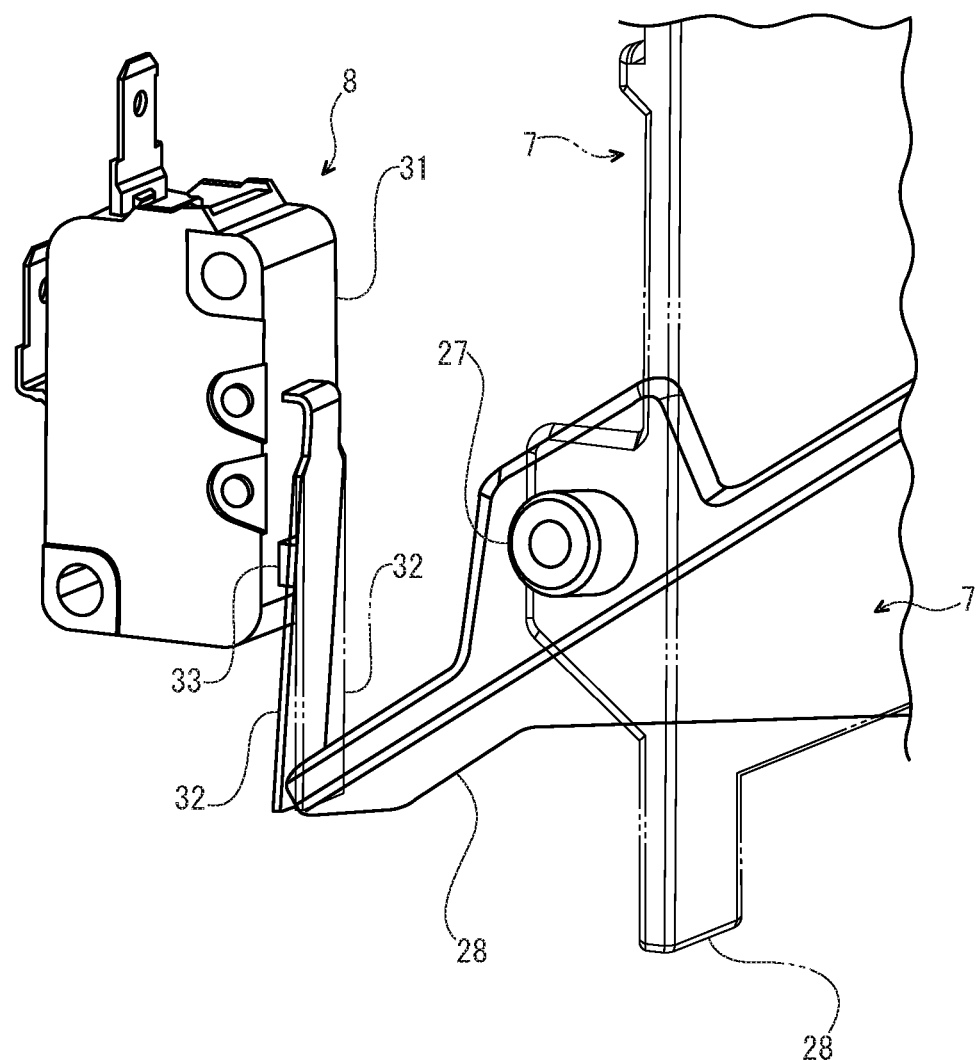
FIG. 3 is a perspective view showing a manual bypass tray and an opening/closing sensor, in the image forming apparatus according to the embodiment of the present disclosure.

With reference to FIG. 2 and FIG. 3, a fulcrum part 27 is provided at the lower portion of the manual bypass tray 7. The fulcrum part 27 is engaged with an engagement part (not shown) of the apparatus main body 5 in a rotatable manner. Then, the manual bypass tray 7 is turnable around the fulcrum part 27 with respect to the apparatus main body 5 between an open posture where the manual bypass tray 7 is opened to the apparatus main body 5 (refer to the solid line in FIG. 2 and FIG. 3) and a close posture where the manual bypass tray 7 is closed to the apparatus main body 5 (refer to the two-dotted chain line in FIG. 2 and FIG. 3). That is, the manual bypass tray 7 is openable and closable to the apparatus main body 5. At the lower end portion of the manual bypass tray 7, a pushing part 28 is provided below the fulcrum part 27.

On the inner face of the manual bypass tray 7, a sheet placement face 29 on which the sheet S is placed is provided. In a state where the manual bypass tray 7 is turned into the open posture (refer to the solid line in FIG. 2 and FIG. 3), the sheet placement face 29 faces upward so that the sheet S can be placed on the sheet placement face 29. That is, it becomes possible to feed the sheet S. On the other hand, in a state where the manual bypass tray 7 is turned into the close posture (refer to the two-dotted chain line in FIG. 2 and FIG. 3), the sheet placement face 29 faces rearward so that the sheet S cannot be placed on the sheet placement face 29. That is, it becomes impossible to feed the sheet S.

Next, the opening/closing sensor 8 of the image forming apparatus 2 will be described.

With reference to FIG. 3, the opening/closing sensor 8 is a contact type sensor, for example. The opening/closing sensor 8 includes a sensor main body 31 and an elastic piece 32 provided in the front portion of the sensor main body 31. On the front face of the sensor main body 31, a switch 33 is provided. The upper end portion of the elastic piece 32 is fixed to the front face of the sensor main body 3 and the lower end portion of the elastic piece 32 is not fixed anywhere. Then, the elastic piece 32 is deformable around the upper end portion.

As shown by the solid line in FIG. 3, when the manual bypass tray 7 is turned into the open posture, the pushing part 28 of the manual bypass tray 7 pushes the elastic piece 32, and the elastic piece 32 is deformed rearward. Then, the elastic piece 32 pushes the switch 33 to switch the opening/closing sensor 8 from an OFF state into a ON state. As a result, the opening/closing sensor 8 detects that the manual bypass tray 7 is opened to the apparatus main body 5. On the other hand, as shown by the two-dotted chain line in FIG. 3, when the manual bypass tray 7 is turned into the close posture, the pushing of the elastic piece 32 by the pushing part 28 of the manual bypass tray 7 is released, and the elastic piece 32 is elastically returned forward. Then, the pushing of the switch 33 by the elastic piece 32 is released, and the switch 33 is switched into the OFF state from the ON state. As a result, the opening/closing sensor 8 detects that the manual bypass tray 7 is closed to the apparatus main body 5. As described above, the opening/closing sensor 8 is detectable that the manual bypass tray 7 is opened and closed.

Next, the terminal apparatus 3 of the image forming system 1 will be described.

With reference to FIG. 1, the terminal apparatus 3 is a personal computer, for example. The terminal apparatus 3 includes a main device 35, an input device 36 and a display device 37. The input device 36 includes a keyboard 38 and a mouse 39, for example. The user instructs (inputs) setup conditions (number of the sheets to be printed, a sheet feeding source and the others) to the input device 36. The sheet feeding source contains the sheet feeding cassette 6 and the manual bypass tray 7. The display device 37 is constituted by a liquid crystal display, for example.

Next, the electrical configuration of the image forming system 1 will be described.

Figure 4:
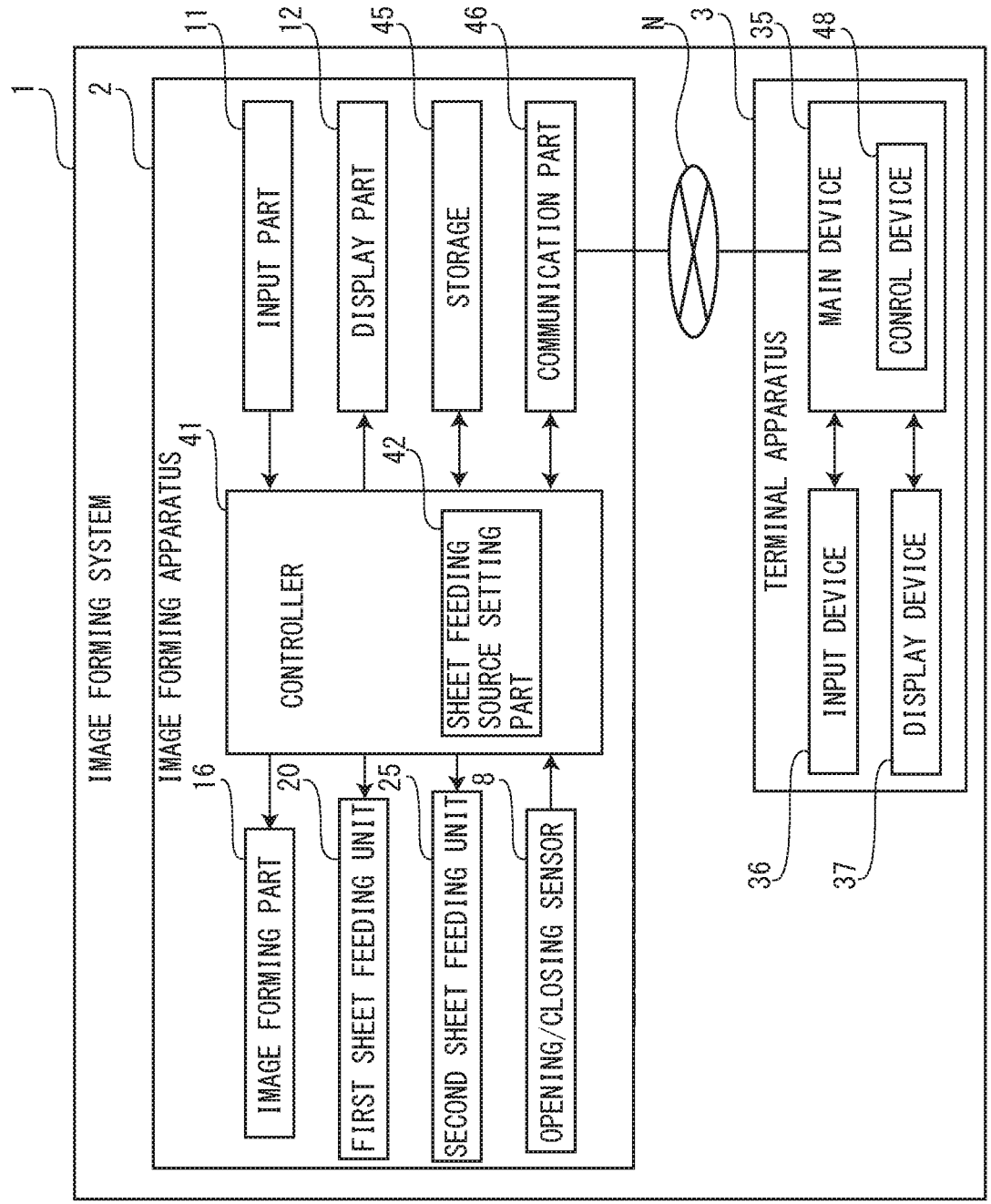
FIG. 4 is a block diagram showing an electrical configuration of the image forming system according to the embodiment of the present disclosure.

With reference to FIG. 4, the image forming apparatus 2 of the image forming system 1 includes a controller 41. The controller 41 is constituted by a central processing unit (CPU), for example. The controller 41 has a sheet feeding source setting part 42. The sheet feeding source setting part 42 sets the sheet feeding cassette 6 or the manual bypass tray 7 as the sheet feeding source.

The controller 41 is electrically connected to each image forming part 16. Each image forming part 16 forms a toner image based on a signal from the controller 41. The controller 41 is electrically connected to the first sheet feeding unit 20. The first sheet feeding unit 20 feeds the sheet S from the sheet feeding cassette 6 to the main conveyance path 19 based on a signal from the controller 41. That is, when the sheet feeding source setting part 42 sets the sheet feeding cassette 6 as the sheet feeding source, the controller 41 makes the first sheet feeding unit 20 perform the sheet feeding from the sheet feeding cassette 6. The controller 41 is electrically connected to the second sheet feeding unit 25. The second sheet feeding unit 25 feeds the sheet S from the manual bypass tray 7 to the sub conveyance path 24 based on a signal from the controller 41. That is, when the sheet feeding source setting part 42 sets the manual bypass tray 7 as the sheet feeding source, the controller 41 makes the second sheet feeding unit 25 perform the sheet feeding from the manual bypass tray 7.

The controller 41 is electrically connected to the opening/closing sensor 8. The opening/closing sensor 8 detects the opening and the closing of the manual bypass tray 7, and then outputs the detection result to the controller 41. The controller 41 detects that the manual bypass tray 7 is turned from the close posture to the open posture and the manual bypass tray 7 is turned from the open posture to the close posture, based on the detection result. That is, when the manual bypass tray 7 is turned from the close posture to the open posture and the switch 33 of the opening/closing sensor 8 is pushed, the controller 41 sets a flag indicating that the manual bypass tray 7 is in the open posture (for example, it stores "1"). On the contrary, when the manual bypass tray 7 is turned from the open posture to the close posture and the pushing of the switch 33 of the opening/closing sensor 8 is released, the controller 41 sets a flag indicating that the manual bypass tray 7 is in the close posture (for example, it stores "0"). The controller 41 determines that the manual bypass tray 7 is turned from the close posture to the open posture (the manual bypass tray 7 is opened) when it is detected that the flag is changed from "0" to "1". The controller 41 determines that the manual bypass tray 7 is turned from the open posture to the close posture (the manual bypass tray 7 is closed) when it is detected that the flag is changed from "1" to "0".

The controller 41 is electrically connected to the input part 11 and the display part 12. The input part 11 receives an input of a printing instruction by the user, and then sends an input result to the controller 41. The input part 11 receives the sheet feeding source input by the user, and then sends the input sheet feeding source to the controller 41. The display part 12 displays an input screen for the printing instruction and a selection screen for the sheet feeding source, based on a signal from the controller 41.

The controller 41 is electrically connected to a storage 45. The storage 45 includes a random access memory (RAM) and a read only memory (ROM), for example. The controller 41 controls each part of the image forming apparatus 2 based on a control program stored in the storage 45.

The controller 41 is connected to a communication part 46. The communication part 46 is communicated with the main device 35 of the terminal apparatus 3 over a wide area network (WAN) or a local area network (LAN).

With reference to FIG. 4, the main device 35 of the terminal apparatus 3 of the image forming system 1 includes a control device 48. The control device 48 is constituted by a central processing unit (CPU), for example. The control device 48 is connected to the input device 36 and the display device 37. The input device 36 receives an input of a printing instruction from the user, and then sends an input result to the control device 48. The input device 48 receives the sheet feeding source input by the user, and then sends the input sheet feeding source to the control device 48. The display device 37 displays an input screen for the printing instruction and a selection screen for the sheet feeding source, based on a signal from the control device 48.

Next, the input of the printing instruction by the user will be described.

In a case where the user inputs the printing instruction to the input part 11 of the image forming apparatus 2, for example, the user inserts a USB memory to the USB port 13 to connect the USB memory to the image forming apparatus 2. Next, the user operates the input part 11 of the image forming apparatus 2, and selects a file to be printed among files stored in the USB memory. Then, the user instructs the setup conditions (number of the sheets to be printed, a sheet feeding source and the others) regarding the printing to the input part 11. After that, the user instructs a printing start to the input part 11.

On the other hand, in a case where the user inputs the printing instruction to the input device 36 of the terminal apparatus 3, for example, the user operates the input device 36 of the terminal apparatus 3, and selects a file to be printed among files stored in the main device 35, in the same manner as the input part 11 of the image forming apparatus 2. Then, the user instructs the setup conditions (number of the sheets to be printed, a sheet feeding source and the others) regarding the printing to the input device 36. After that, the user instructs a printing start to the input device 36.

Here, when the user desires to feed the sheet from the manual bypass tray 7, he moves to the image forming apparatus 2, and turns the manual bypass tray 7 from the close posture to the open posture. Then, he places the predetermined sheets on the sheet placement face 29 of the manual bypass tray 7. After the sheet feeding from the manual bypass tray 7 is finished, the user turns the manual bypass tray 7 from the open posture to the close posture.

Next, a printing operation of the image forming system 1 will be described.

When the printing instruction is input to the input part 11 of the image forming apparatus 2 or the input device 36 of the terminal apparatus 3 by the user as described above, each image forming part 16 forms the toner image based on the electrostatic latent image formed by the exposure device 17. The toner images are primarily transferred from each image forming part 16 to the intermediate transferring belt 15.

Furthermore, when the printing instruction is input to the input part 11 of the image forming apparatus 2 or the input device 36 of the terminal apparatus 3 by the user as described above, the first sheet feeding unit 20 feeds the sheet S from the sheet feeding cassette 6 to the main conveyance path 19 or the second sheet feeding unit 25 feeds the sheet S from the manual bypass tray 7 to the sub conveyance path 24. The sheet S fed to the sub conveyance path 24 is conveyed downstream along the sub conveyance path 24 and then the main conveyance path 19.

The sheet thus conveyed to the main conveyance path 19 is conveyed downstream along the main conveyance path 19, and enters a nip area between the intermediate transferring belt 15 and the secondary transferring part 21. The secondary transferring part 21 secondarily transfers the toner image primarily transferred to the intermediate transferring belt 15 to the sheet S. The sheet S on which the toner image is secondarily transferred is further conveyed downstream along the main conveyance path 19, and then enters the fixing device 22. The fixing device 22 fixes the toner image on the sheet S. The sheet S on which the toner image is fixed is further conveyed downstream along the main conveyance path 19, and then discharged on the discharge tray 10 by the discharge unit 23.

Next, a first to a third examples of a control to feed the sheet from the sheet feeding cassette 6 or the manual bypass tray 7 (hereinafter, called "a sheet feeding control") will be described.

First Example of Sheet Feeding Control

Figure 5:
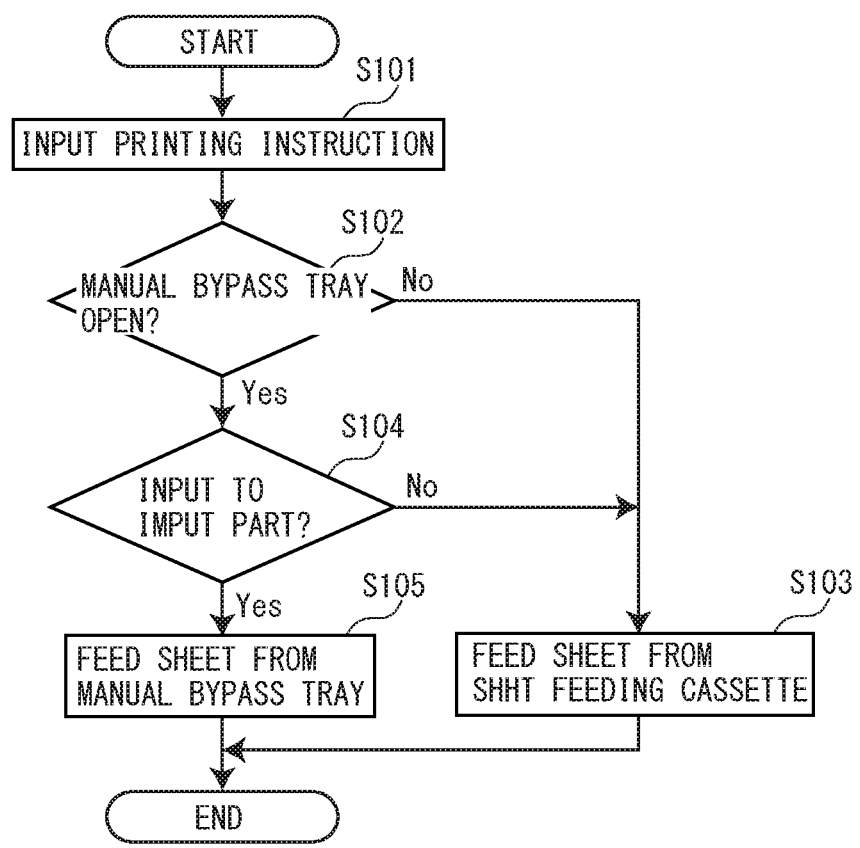
FIG. 5 is a flowchart showing a first example of a sheet feeding control, in the image forming system according to the embodiment of the present disclosure.

With reference to FIG. 5, the first example of the sheet feeding control will be described.

When the printing instruction is input to the input part 11 of the image forming apparatus 2 or the input device 36 of the terminal apparatus 3 (step S101), the controller 41 determines whether the manual bypass tray 7 is turned from the close posture to the open posture (the manual bypass tray 7 is opened), based on the detection result of the opening/closing sensor 8 (step S102).

When the determination in step S102 is No (when the manual bypass tray 7 is not turned from the close posture to the open posture), regardless of the sheet feeding source instructed by the input part 11 or the input device 36, the sheet feeding source setting part 42 sets the sheet feeding cassette 6 as the sheet feeding source, and makes the first sheet feeding unit 20 perform the sheet feeding from the sheet feeding cassette 6 (step S103). Then, the first example of the sheet feeding control is completed.

On the other hand, when the determination in step S102 is Yes (when the manual bypass tray 7 is turned from the close posture to the open posture), the controller 41 determines whether the printing instruction is input to the input part 11 of the image forming apparatus 2 in step S101 (step S104).

When the determination in step S104 is Yes (when the printing instruction is input to the input part 11 of the image forming apparatus 2 in step S101), regardless the sheet feeding source instructed to the input part 11, the sheet feeding source setting part 42 sets the manual bypass tray 7 as the sheet feeding source, and makes the second sheet feeding unit 25 perform the sheet feeding from the manual bypass tray 7 (step S105). Then, the first example of the sheet feeding control is completed.

On the other hand, when the determination in step S104 is No (when the printing instruction is input to the input device 36 of the terminal apparatus 3 in step S101), regardless the sheet feeding source instructed to the input device 36, the sheet feeding source setting part 42 sets the sheet feeding cassette 6 as the sheet feeding source, and makes the first sheet feeding unit 20 perform the sheet feeding from the sheet feeding cassette 6 (step S103). Then, the first example of the sheet feeding control is completed.

As described above, in the first example, in a case where the manual bypass tray 7 is turned from the close posture to the open posture, when the printing instruction is input to the input part 11 of the image forming apparatus 2, the sheet S is automatically fed from the manual bypass tray 7.

That is, when the user desires to print on a special sheet such as a cardboard, he moves to the image forming apparatus 2, turns the manual bypass tray 7 from the close posture to the open posture, and then places the special sheet on the sheet placement face 29. After that, he instructs the manual bypass tray 7 as the sheet feeding source to the input part 11, and then instructs a printing start. When the user appropriately instructs the manual bypass tray 7 as the sheet feeding source, the printing is performed on the special sheet placed on the sheet placement face 29 of the manual bypass tray 7, as desired by the user. However, when the user forgets to instruct the sheet feeding source under the condition where the sheet feeding source is set to the sheet feeding cassette 6 as a default or the user instructs the sheet feeding cassette 6 as the sheet feeding source mistakenly, even though he opens the manual bypass tray 7, the sheet feeding source setting part 42 sets the sheet feeding cassette 6 as the sheet feeding source, and the sheet is fed from the sheet feeding cassette 6. Then, in the first example, the user's action of opening the manual bypass tray 7 has a priority over the sheet feeding source setting part 42, and the sheet is automatically fed from the manual bypass tray 7.

On the other hand, when the printing instruction is input to the input device 36 of the terminal apparatus 3, the sheet is automatically fed from the sheet feeding cassette 6. That is, in many cases, when the user of the terminal apparatus 3 desires printing on the plain paper, he instructs to feed the sheet from the sheet feeding cassette 6 to the input device 36, and only when he desires printing on the special paper, he moves to the image forming apparatus 2 and then turns the manual bypass tray 7 as described above. For example, when the terminal apparatus 3 and the image forming apparatus 2 are separated from each other and the terminal apparatus's user cannot recognize visually what kind of sheet is placed on the manual bypass tray 7, he hardly instructs to feed the sheet from the manual bypass tray 7, and in many cases, he instructs to feed the sheet from the sheet feeding cassette 6. Then, in a case where the printing instruction is input to the input device 36, regardless of the sheet feeding source set by the sheet feeding source setting part 42, the sheet is automatically fed from the sheet feeding cassette 6.

As described above, according to the first example, it becomes possible to suitably feed the sheet desired by the user.

Second Example of Sheet Feeding Control

Figure 6:
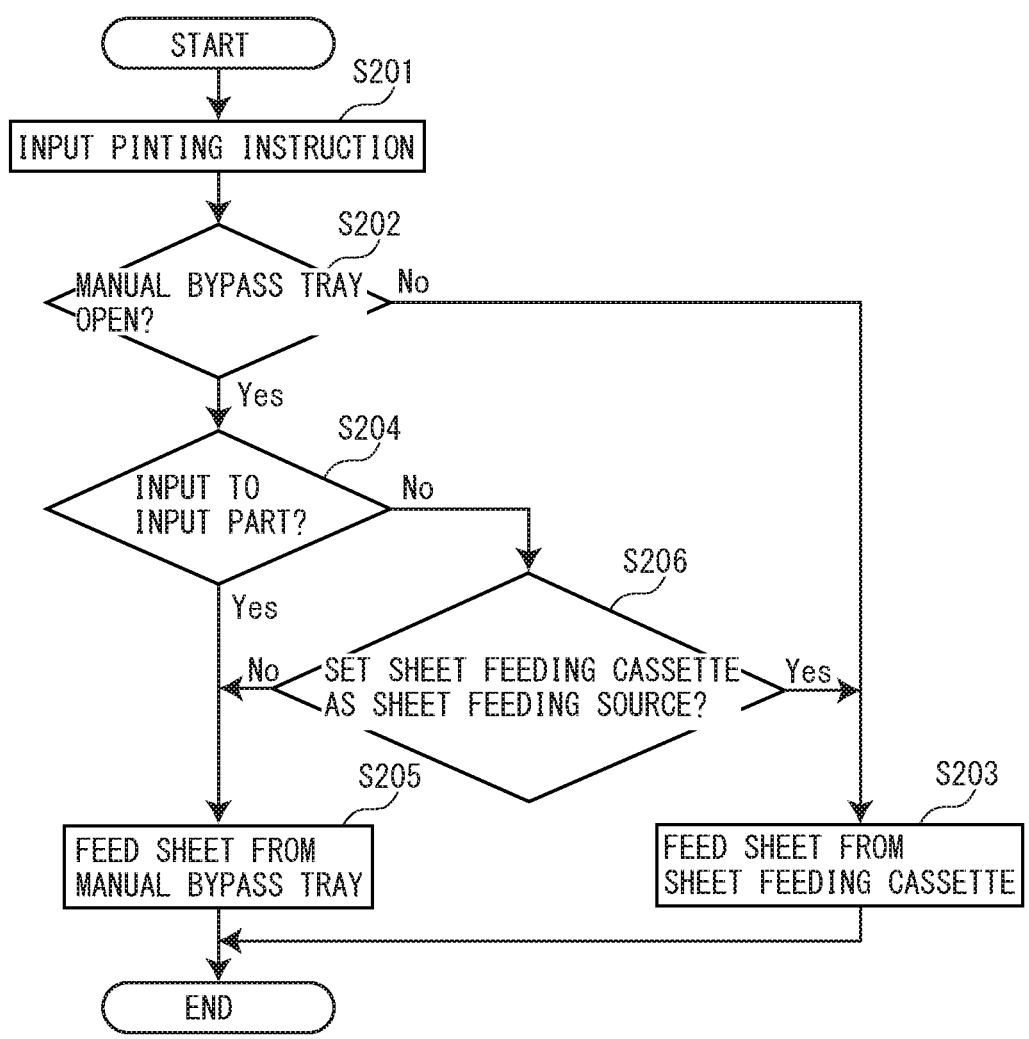
FIG. 6 is a flowchart showing a second example of the sheet feeding control, in the image forming system according to the embodiment of the present disclosure.

Next, with reference to FIG. 6, the second example of the sheet feeding control will be described. Steps S 201 to S204 of the second example of the sheet feeding control are the same as steps S101 to S104 of the first example of the sheet feeding control, and their explanations are omitted.

When the determination in step S204 is Yes (when the printing instruction is input to the input part 11 of the image forming apparatus 2 in step S201), regardless of the sheet feeding source instructed by the input part 11, the sheet feeding source setting part 42 sets the manual bypass tray 7 as the sheet feeding source, and makes the second sheet feeding unit 25 perform the sheet feeding from the manual bypass tray 7 (step S205). Then, the second example of the sheet feeding control is completed.

On the other hand, when the determination in step S204 is No (when the printing instruction is input to the input device 36 of the terminal apparatus 3 in step S201), the controller 41 determines whether the sheet feeding cassette 6 is instructed as the sheet feeding source to the input device 36 (step S206).

When the determination in step S206 is Yes (when the sheet feeding cassette 6 is instructed as the sheet feeding source to the input device 36), the sheet feeding source setting part 42 sets the sheet feeding cassette 6 as the sheet feeding source, and makes the first sheet feeding unit 20 perform the sheet feeding from the sheet feeding cassette 6 (step S203). Then, the second example of the sheet feeding control is completed.

On the other hand, when the determination in step S206 is No (when the manual bypass tray 7 is instructed as the sheet feeding source to the input device 36), the sheet feeding source setting part 42 sets the manual bypass tray 7 as the sheet feeding source, and makes the second sheet feeding unit 25 perform the sheet feeding from the manual bypass tray 7 (step S205). Then, the second example of the sheet feeding control is completed.

As described above, according to the second example, it becomes possible to print on the sheet fed from the manual bypass tray 7 on the terminal apparatus 3. Accordingly, in a case where the user inputs the printing instruction to the terminal apparatus 3, it becomes possible to widen a selection range of the sheet feeding source.

Third Example of Sheet Feeding Control

Figure 7:
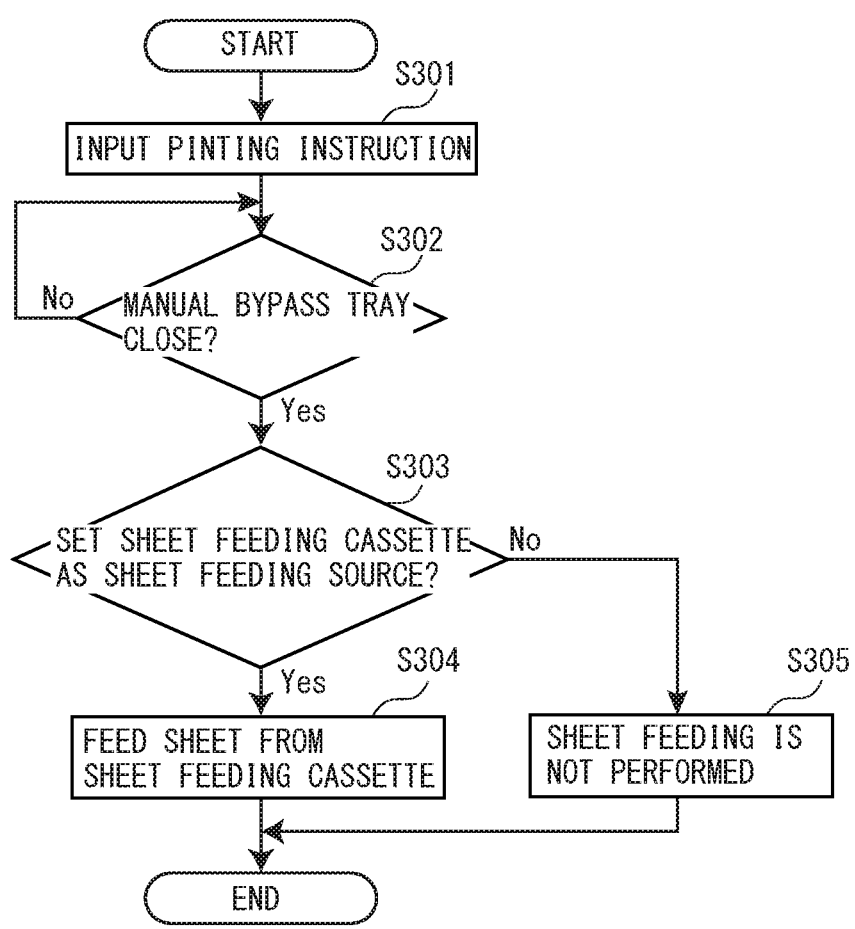
FIG. 7 is a flowchart showing a third example of the sheet feeding control, in the image forming system according to the embodiment of the present disclosure.

Next, with reference to FIG. 7, the third example of the sheet feeding control will be described.

When the printing instruction is input to the input part 11 of the image forming apparatus 2 or the input device 36 of the terminal apparatus 3 (step S301), the controller 41 determines whether the manual bypass tray 7 is turned from the open posture to the close posture (whether the manual bypass tray 7 is closed), based on the detection result of the opening/closing sensor 8 (step S302).

When the determination in step S302 is Yes (when the manual bypass tray 7 is turned from the open posture to the close posture), the controller 41 determines whether the sheet feeding cassette 6 is instructed as the sheet feeding source to the input part 11 or the input device 36 (step S303).

When the determination in step S303 is Yes (when the sheet feeding cassette 6 is instructed as the sheet feeding source to the input part 11 or the input device 36), the sheet feeding source setting part 42 sets the sheet feeding cassette 6 as the sheet feeding source, and makes the first sheet feeding unit 20 perform the sheet feeding from the sheet feeding cassette 6 (step S304). Then, the third example of the sheet feeding control is completed.

On the other hand, when the determination in step S303 is No (when the manual bypass tray 7 is instructed as the sheet feeding source to the input part 11 or the input device 36), the controller 41 does not make the first and second sheet feeding units 20 and 25 perform the sheet feeding (step S305). Then, the third example of the sheet feeding control is completed.

As described above, according to the third example, when the manual bypass tray 7 is turned from the open posture to the close posture, that is, when the user closes the manual bypass tray 7, and further when the manual bypass tray 7 is instructed as the sheet feeding source to the input part 11 or the input device 6, the sheet feeding is not performed. Accordingly, it becomes possible to suitably determine whether the sheet feeding is possible. When the manual bypass tray 7 is turned from the open posture to the close posture, regardless of the sheet feeding source instructed to the input part 11 or the input device 36, the sheet feeding source setting part 42 may set the sheet feeding cassette 6 as the sheet feeding source.

By the way, as described above, in the first to the third examples of the sheet feeding control, when the opening/closing sensor 8 detects that the manual bypass tray 7 is turned from the close posture to the open posture and the printing instruction is input to the input part 11 of the image forming apparatus 2, regardless of the sheet feeding source instructed to the input part 11, the sheet feeding source setting part 42 sets the manual bypass ray 7 as the sheet feeding source. In such a configuration, when the user forgets that the manual bypass tray 7 is opened, there is a possibility that even though he desires to feed the sheet from the sheet feeding cassette 6, the sheet is fed from the manual bypass tray 7.

Figure 8:
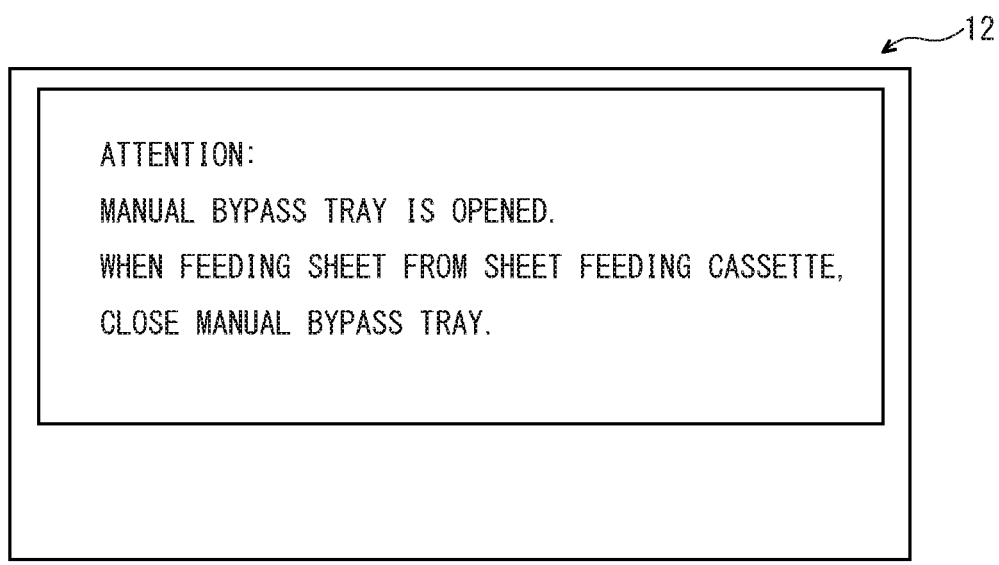
FIG. 8 is a view showing an example of a notification screen displayed on a display part, in the image forming system according to the embodiment of the present disclosure.

Then, in the present embodiment, as shown in FIG. 8, when the opening/closing sensor 8 detects that the manual bypass tray 7 is turned from the close posture to the open posture, the display part 12 of the image forming apparatus 2 displays an notification screen which notices that the manual bypass tray 7 is opened. By applying such a configuration, the user makes aware that the manual bypass tray 7 is opened, and it becomes possible to inhibit the sheet from being fed from the manual bypass tray 7 even though the user desires to feed the sheet from the sheet feeding cassette 6.

As shown in FIG. 8, the above notification screen displayed on the display part 12 urges the user to close the manual bypass tray 7 when he desires to feed the sheet from the sheet feeding cassette 6. By applying such a configuration, it becomes possible to inhibit the sheet from being fed from the manual bypass tray 7 even though he desires to feed the sheet from the sheet feeding cassette 6.

Next, a modified example of the present disclosure will be described. In the modified example, as shown in FIG. 2, the manual bypass tray 7 is provided with a sheet sensor 51 as a sheet detection part which detects whether the sheet is placed on the sheet placement face 29. The sheet sensor 51 includes an actuator and an optical sensor, for example. The actuator turns between a detection position where it protrudes upward from the sheet placement face 29 and a retract position where it retracts below the sheet placement face 29. The optical sensor has an optical path which is formed or blocked by the turning actuator. The sheet sensor 51 is electrically connected to the controller 41.

When the sheet is placed on the sheet placement face 29 and the actuator is turned from the detection position to the retract position, the optical path of the optical sensor is blocked (or formed) and the sheet sensor 51 outputs an ON signal to the controller 41. When the ON signal is received, the controller 41 determines that the sheet is placed on the sheet placement face 29. On the other hand, when the sheet is not placed on the sheet placement face 29 and the actuator is turned to the detection position, the optical path of the optical sensor is formed (or blocked) and the sheet sensor 51 outputs an OFF signal to the controller 41. When the OFF signal is received, the controller 41 determines that the sheet is not placed on the sheet placement face 29.

Figure 9:
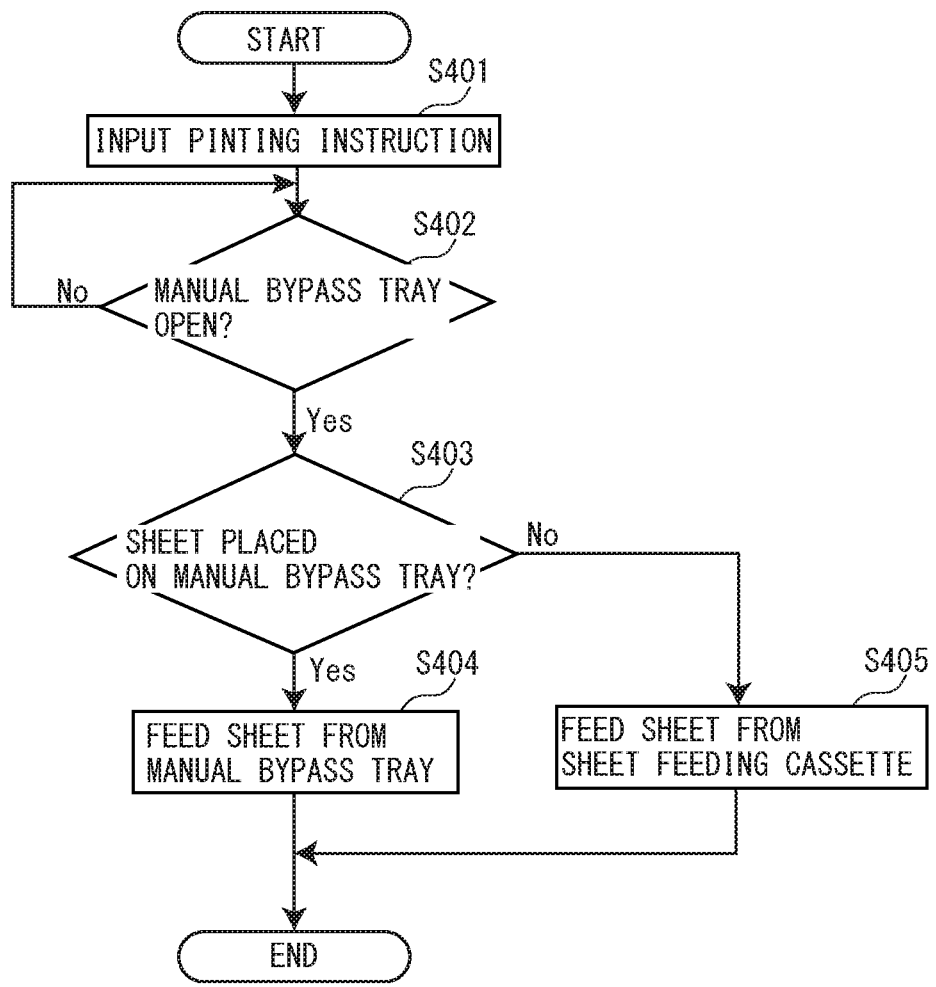
FIG. 9 is a flowchart showing a modified example of the sheet feeding control, in the image forming system according to the embodiment of the present disclosure.

Next, an example of the sheet feeding control in the modified example will be described with reference to the flowchart shown in FIG. 9.

When the printing instruction is input to the input part 11 of the image forming apparatus 2 or the input device 36 of the terminal apparatus 3 (step S401), the controller 41 determines whether the manual bypass tray 7 is turned from the close posture to the open posture (whether the manual bypass tray 7 is opened), based on the detection result of the opening/closing sensor 8 (step S402).

When the determination in step S402 is Yes (when the manual bypass tray 7 is opened, in other words, when the user desires to feed the sheet from the manual bypass tray 7), the controller 41 determines whether the sheet sensor 51 detects that the sheet is placed on the sheet placement face 29 of the manual bypass tray 7 (step S403).

When the determination in step S403 is Yes (when the sheet is placed on the sheet placement face 29 of the manual bypass tray 7), the sheet feeding source setting part 42 sets the manual bypass tray 7 as the sheet feeding source. On the other hand, when the determination in step S403 is No (when the sheet is not placed on the sheet placement face 29 of the manual bypass tray 7), the sheet feeding source setting part 42 sets the sheet feeding cassette 6 as the sheet feeding source.

According to the modified example, even if the manual bypass tray 7 is turned to the open posture, when the user desires to feed the sheet from the sheet feeding cassette 6, it becomes possible to feed the sheet from the sheet feeding cassette 6 unless the sheet is not placed on the manual bypass tray 7.

Additionally, in the modified example, when the sheet sensor 51 detects that the sheet is not placed on the sheet placement face 29, the display part 12 may display the notification screen including a massage indicating that the sheet is not placed on the sheet placement face 29.

In the present embodiment, the image forming apparatus 2 includes one sheet feeding cassette 6 and one manual bypass tray 7. On the other hand, in other embodiments, the image forming apparatus 2 may include a plurality of the sheet feeding cassettes 6 and a plurality of the manual bypass trays 7.

In the present embodiment, the opening/closing sensor 8 is a contact type sensor. On the other hand, in other embodiments, the opening/closing sensor 8 may be a non-contact type sensor.

In the present embodiment, the terminal apparatus 3 is a personal computer. On the other hand, in other embodiments, the terminal apparatus 3 may be a device such as a smart phone, other than the personal computer.

In the present embodiment, the image forming apparatus 2 is a color printer. On the other hand, in other embodiments, the image forming apparatus 2 may be a monochrome printer, a copying machine, a facsimile and a multifunctional peripheral (an apparatus having a printing function, a copying function and a facsimile function totally).

In the present embodiment, the image forming apparatus 2 applies an electrophotographic image forming method. On the other hand, in other embodiments, the image forming apparatus 2 may apply an inkjet image forming method.

The invention claimed is:

1. An image forming system comprising:
an image forming apparatus; and
a terminal apparatus connected to the image forming apparatus via a network, wherein
the image forming apparatus includes:
   an apparatus main body having an input part to which a printing instruction is input;
   a sheet feeding cassette stored in the apparatus main body;
   a manual bypass tray attached to an outer face of the apparatus main body and displaced into an open posture where a sheet feeding becomes possible and into a close posture where the sheet feeding becomes impossible;
   an opening/closing detection part which detects displacements of the manual bypass tray from the open posture to the close posture and from the close posture to the open posture; and
   a sheet feeding source setting part which sets the sheet feeding cassette or the manual bypass tray as a sheet feeding source, and
the terminal apparatus includes an input device to which a printing instruction is input, wherein
when the opening/closing detection part detects that the manual bypass tray is displaced from the close posture to the open posture and the printing instruction is input to the input part, regardless of the sheet feeding source input to the input part, the sheet feeding source setting part sets the manual bypass tray as the sheet feeding source, and
when the opening/closing detection part detects that the manual bypass tray is displaced from the close posture to the open posture and the printing instruction is input to the input device, regardless of the sheet feeding source input to the input device, the sheet feeding source setting part sets the sheet feeding cassette as the sheet feeding source.

2. The image forming system according to claim 1, wherein
when the opening/closing detection part detects that the manual bypass tray is displaced from the open posture to the close posture, regarding of the sheet feeding source instructed to the input part or the input device, the sheet feeding source setting part sets the sheet feeding cassette as the sheet feeding source.

3. The image forming system according to claim 1, wherein
when the opening/closing detection part detects that the manual bypass tray is displaced from the open posture to the close posture and the sheet feeding cassette is input as the sheet feeding source to the input part or the input device, the sheet feeding source setting part sets the sheet feeding cassette as the sheet feeding source, and
when the opening/closing detection part detects that the manual bypass tray is displaced from the open posture to the close posture and the manual bypass tray is input as the sheet feeding source to the input part or the input device, a sheet feeding is not performed.

4. The image forming system according to claim 1, wherein
the image forming apparatus includes a sheet detection part which detects whether the sheet is placed on the manual bypass tray displaced into the close open posture, and when the sheet detection part detects that the sheet is not placed on the manual bypass tray, the sheet feeding source setting part sets the sheet feeding cassette as the sheet feeding source.

5. The image forming system according to claim 4, wherein the apparatus main body includes a display part on which an input screen of the printing instruction is displayed, and the display part displays a notification screen indicating that the sheet is not placed on the manual bypass tray.

6. An image forming system comprising:

an image forming apparatus; and a terminal apparatus connected to the image forming apparatus via a network, wherein the image forming apparatus includes:

an apparatus main body having an input part to which a printing instruction is input;

a sheet feeding cassette stored in the apparatus main body;

a manual bypass tray attached to an outer face of the apparatus main body and displaced into an open posture where a sheet feeding becomes possible and into a close posture where the sheet feeding becomes impossible;

an opening/closing detection part which detects displacements of the manual bypass tray from the open posture to the close posture and from the close posture to the open posture; and a sheet feeding source setting part which sets the sheet feeding cassette or the manual bypass tray as a sheet feeding source, and the terminal apparatus includes an input device to which a printing instruction is input, wherein when the opening/closing detection part detects that the manual bypass tray is displaced from the close posture to the open posture and the printing instruction is input to the input part, regardless of the sheet feeding source input to the input part, the sheet feeding source setting part sets the manual bypass tray as the sheet feeding source, and when the opening/closing detection part detects that the manual bypass tray is displaced from the close posture to the open posture and the printing instruction is input to the input device, depending on the sheet feeding source input to the input device, the sheet feeding source setting part sets the sheet feeding cassette or the manual bypass tray as the sheet feeding source.

7. An image forming apparatus comprising:

an apparatus main body having an input part to which a printing instruction is input;

a sheet feeding cassette stored in the apparatus main body;

a manual bypass tray attached to an outer face of the apparatus main body and displaced into an open posture where a sheet feeding becomes possible and into a close posture where a sheet feeding becomes impossible;

an opening/closing detection part which detects displacements of the manual bypass tray from the open posture to the close posture and from the close posture to the open posture; and a sheet feeding source setting part which sets the sheet feeding cassette or the manual bypass tray as a sheet feeding source, wherein when the opening/closing detection part detects that the manual bypass tray is displaced from the close posture to the open posture and the printing instruction is input to the input part, regardless of the sheet feeding source input to the input part, the sheet feeding source setting part sets the manual bypass tray as the sheet feeding source, and when the opening/closing detection part detects that the manual bypass tray is displaced from the close posture to the open posture and the printing instruction is input to an input device other than the input part, regardless of the sheet feeding source input to the input device, the sheet feeding source setting part sets the sheet feeding cassette as the sheet feeding source.

\* \* \* \* \*